B. H. & R. N. BUNN.
PARCEL TIER.
APPLICATION FILED DEC. 9, 1910.

1,038,843.

Patented Sept. 17, 1912.
8 SHEETS—SHEET 1.

Witnesses:
H. E. Bunn
C. M. Bunn

Inventors,
Benjamin H. Bunn
Romanzo N. Bunn
By Glenn S. Noble,
Attorney.

B. H. & R. N. BUNN.
PARCEL TIER.
APPLICATION FILED DEC. 9, 1910.

1,038,843.

Patented Sept. 17, 1912.

8 SHEETS—SHEET 2.

Witnesses:
H. C. Bunn.
C. M. Bunn

Inventors,
Benjamin H. Bunn
Romanzo N. Bunn
By Glenn S. Noble
Attorney.

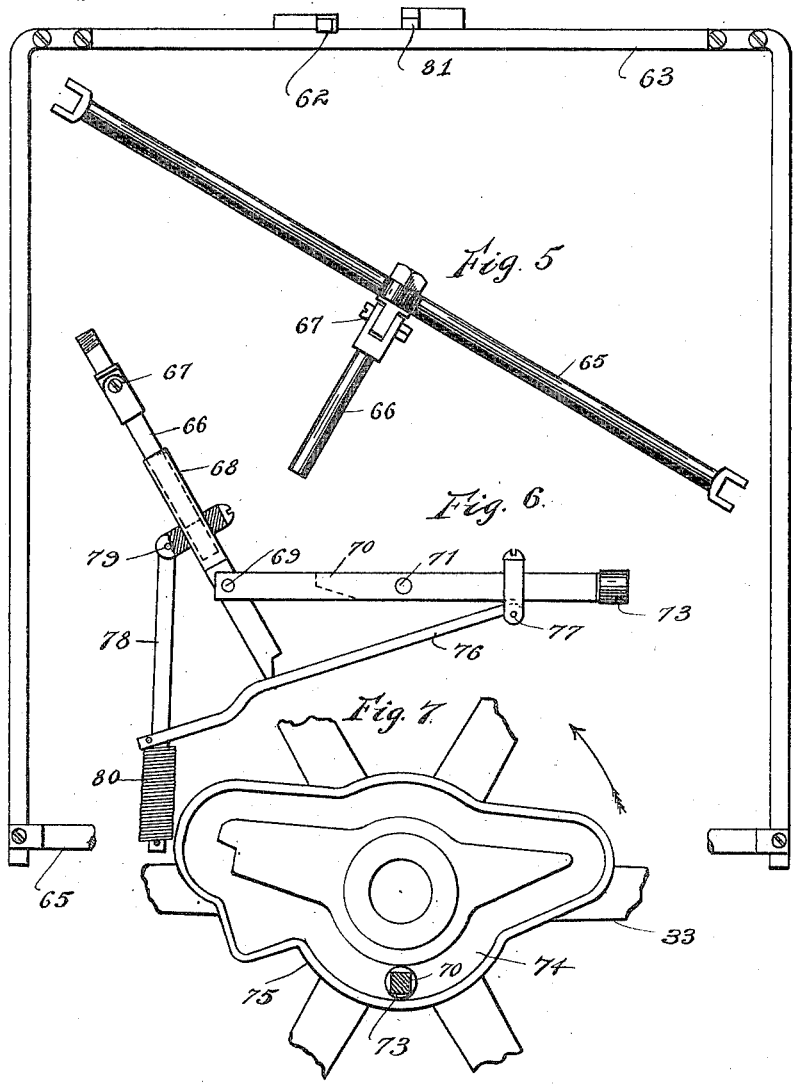

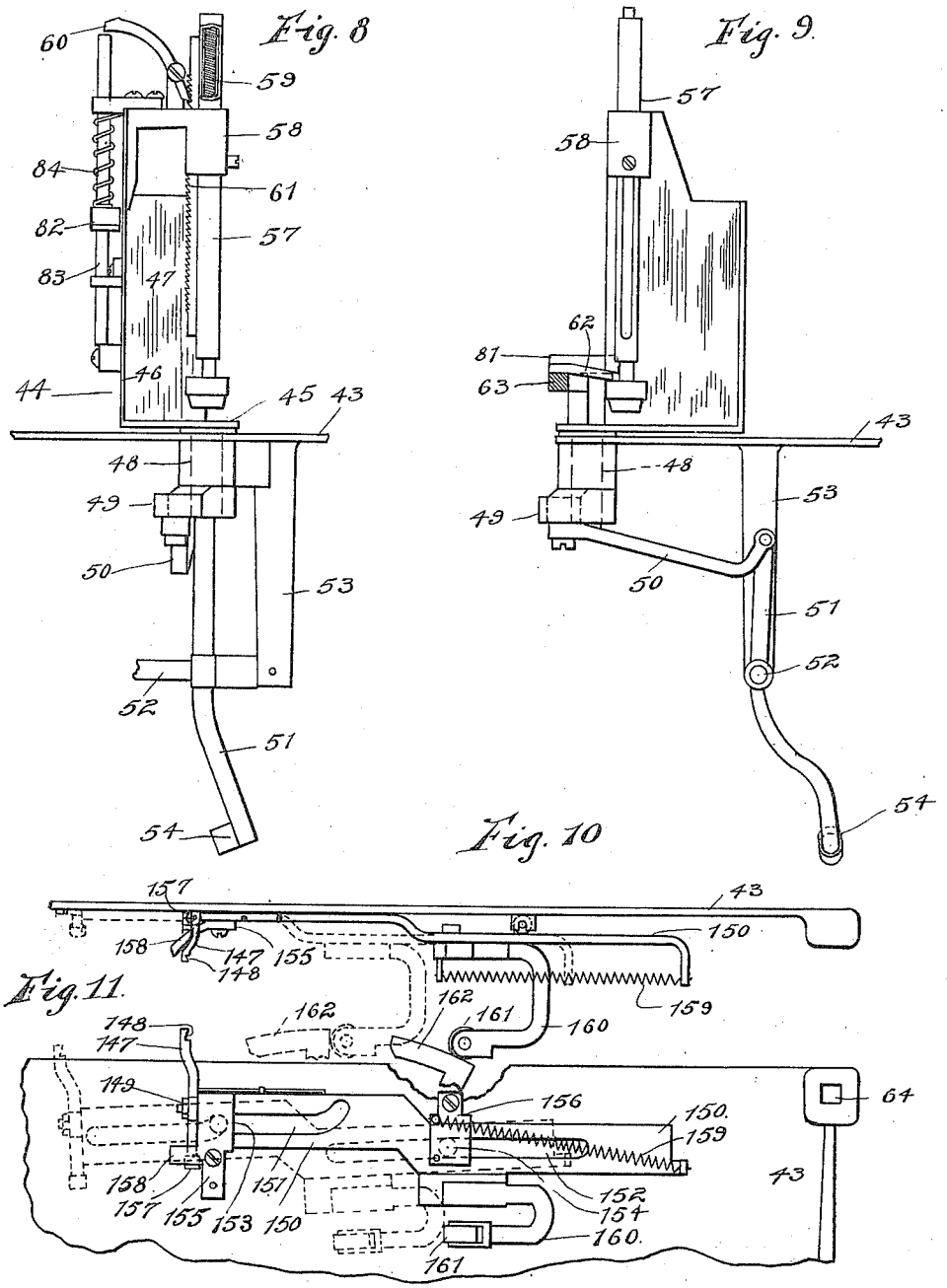

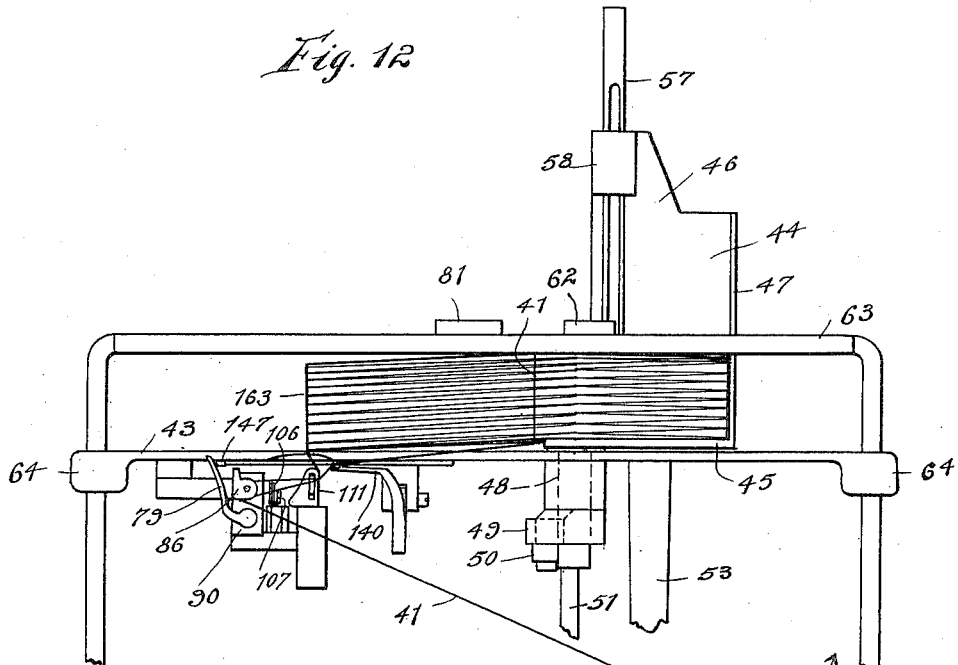
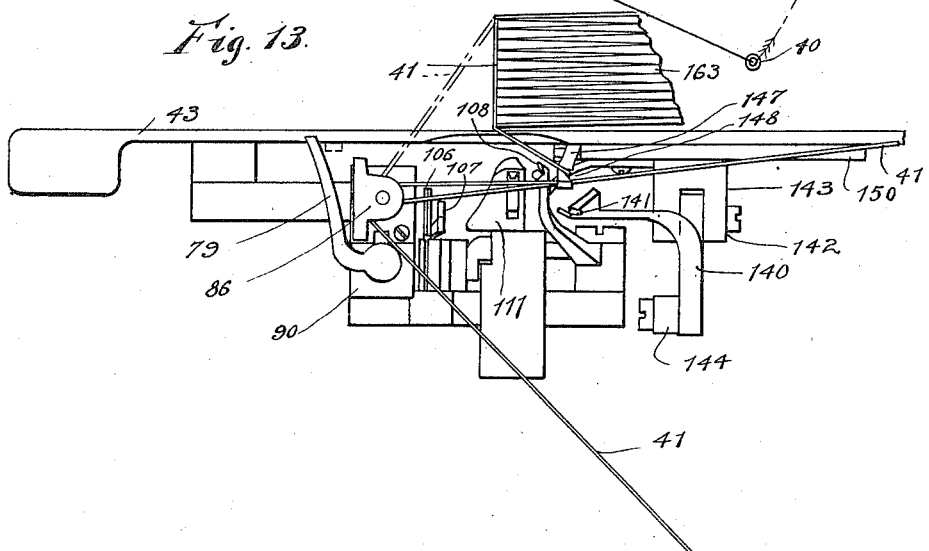

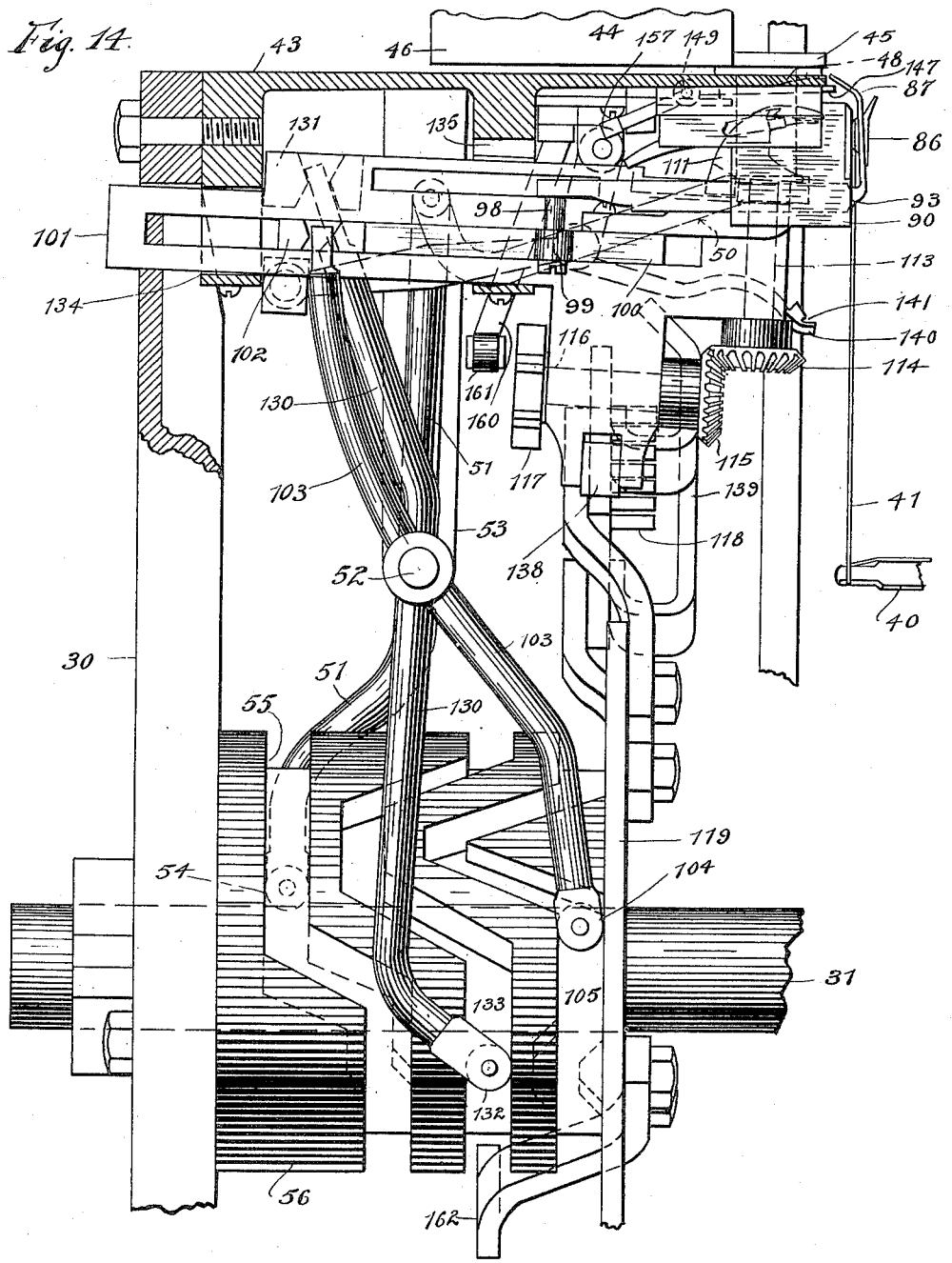

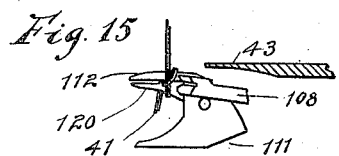
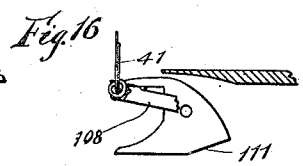
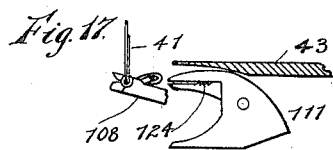
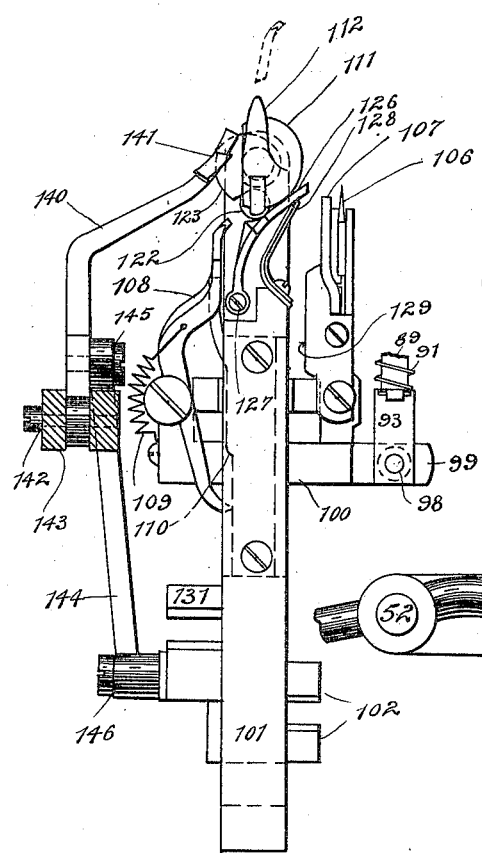
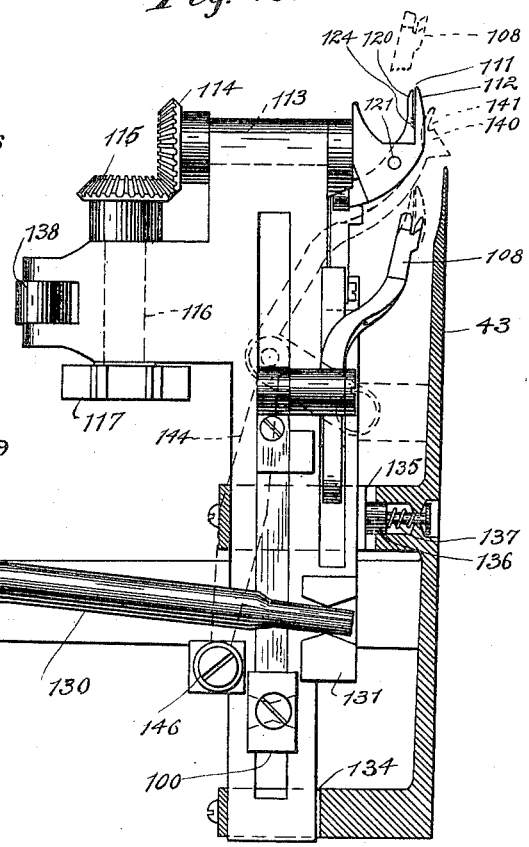

B. H. & R. N. BUNN.
PARCEL TIER.
APPLICATION FILED DEC. 9, 1910.
1,038,843.
Patented Sept. 17, 1912.
8 SHEETS—SHEET 8.
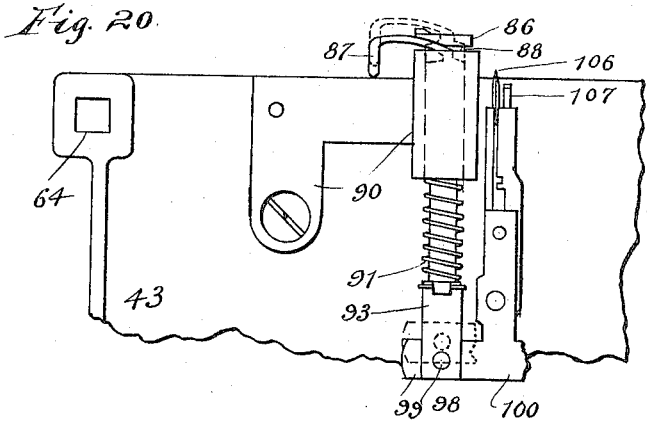
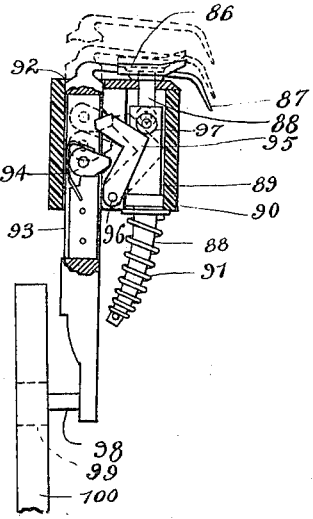
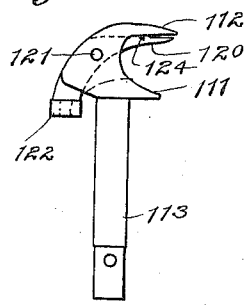
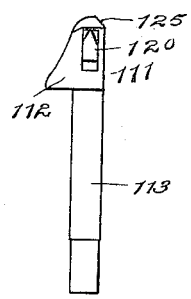
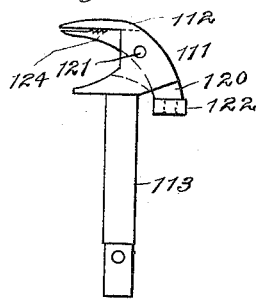
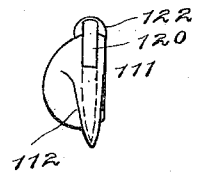
WITNESSES:
H. E. Bunn.
C. M. Bunn
INVENTORS,
Benjamin H. Bunn.
Romanzo N. Bunn
By Glenn S. Noble
ATTORNEY.

UNITED STATES PATENT OFFICE.

BENJAMIN H. BUNN AND ROMANZO N. BUNN, OF CHICAGO, ILLINOIS.

PARCEL-TIER.

1,038,843.  Specification of Letters Patent.  Patented Sept. 17, 1912.

Application filed December 9, 1910. Serial No. 596,482.

*To all whom it may concern:*

Be it known that we, BENJAMIN H. BUNN and ROMANZO N. BUNN, citizens of the United States, residing at Chicago, in the county of Cook and State of Illinois, have invented certain new and useful Improvements in Parcel-Tiers, of which the following is a specification.

This invention relates to machines for tying parcels, bundles or packages, and is designed to wrap a string or cord from a suitable supply around the package, preferably in two directions, and then tie the string tightly adjacent to the package or parcel so that after the knot is completed the package will be securely and tightly bound. One of the principal uses for which our invention is intended is that of tying packages of letters or other mail matter, but obviously the machine is adapted for tying various kinds of packages or parcels.

Among the objects of the present invention are to provide a simple, compact and efficient machine for clamping a parcel, package of letters or the like securely on a receiving plate, winding the string or cord around the package in one direction, then turning the package so that the string will be wound around in another direction without loosening the tension of the same, then knotting the string and severing the same without leaving any short pieces of string to fall from the knotter, and finally releasing the package preparatory for the next operation.

Other special advantages, such as relate to the details of construction and arrangement of parts, and particularly to the knotting mechanism, will be more particularly pointed out and described in the following specification.

We have illustrated our invention in the accompanying drawings, in which—

Figure 1:
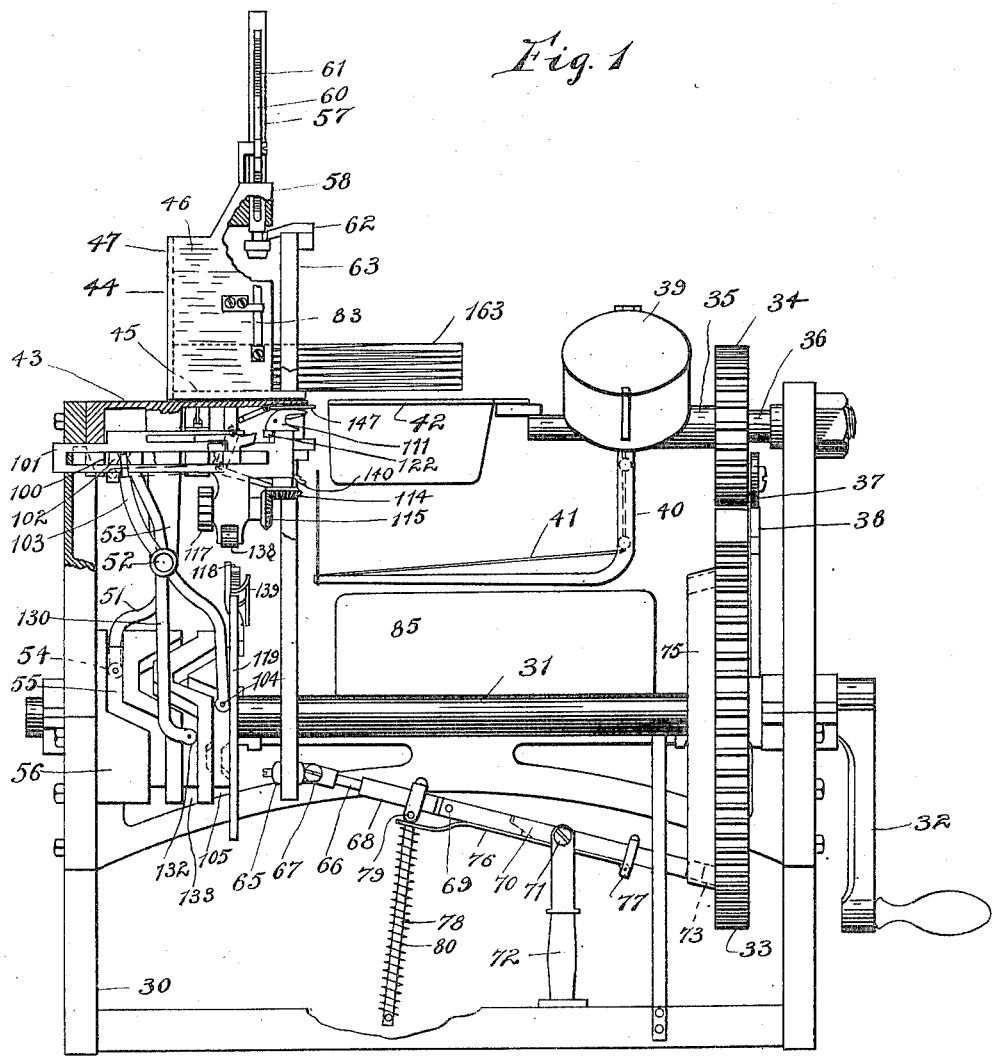
Figure 2:
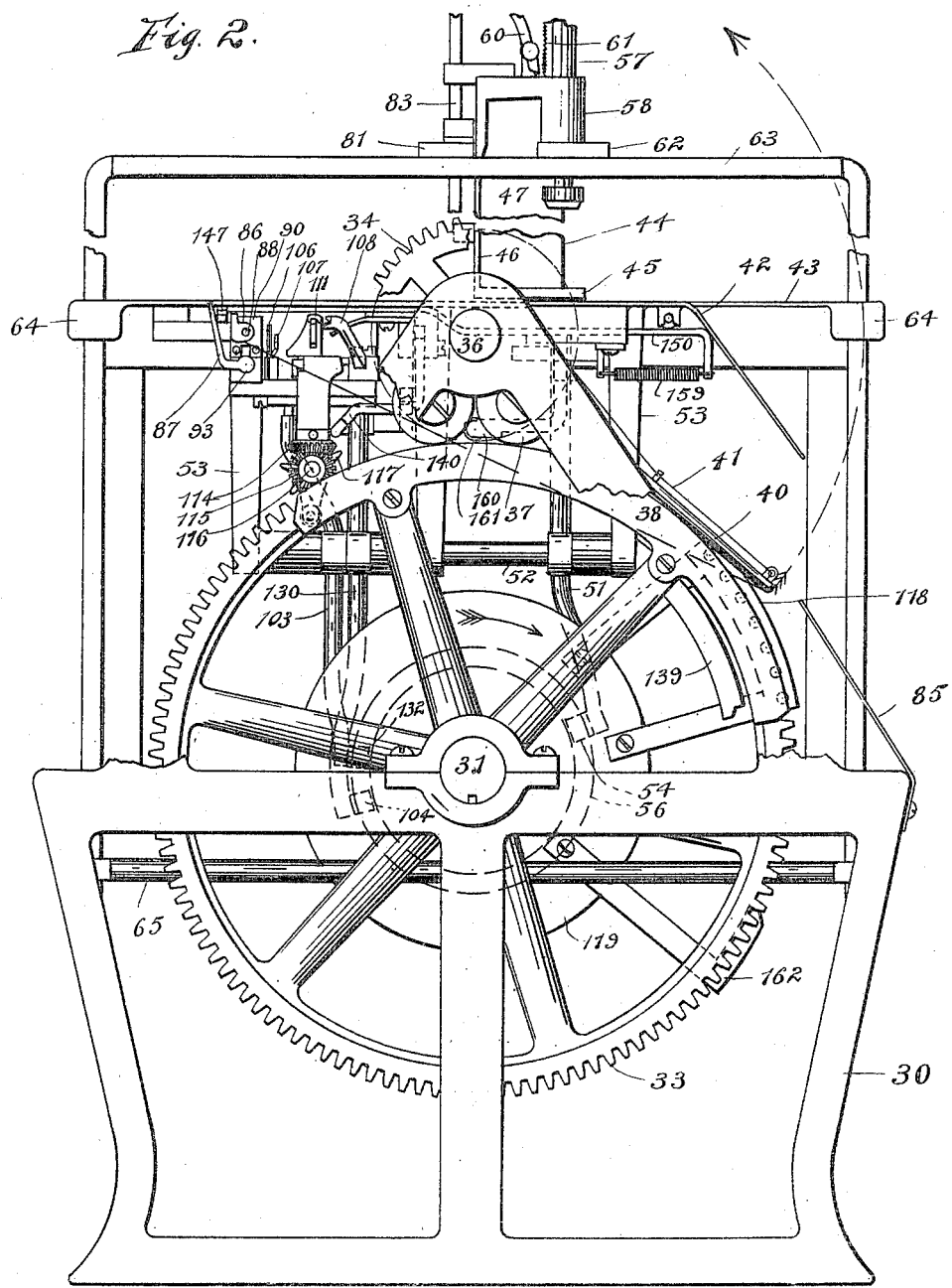

Figure 1 is a front elevation of the machine, parts being omitted, broken away, or shown diagrammatically for convenience in illustration; Fig. 2 is an enlarged end view taken from the right-hand side of Fig. 1, parts in this view also being broken away for convenience in illustration; Figs. 3, 4, 5, 6 and 7 are details of portions of the package or parcel-clamping or compressing devices and cam for operating the same; Fig. 8 is an enlarged detail of one of the package-clamping devices, also showing a portion of the mechanism for turning the package receiver; Fig. 9 is a side view of the mechanism shown in Fig. 8; Figs. 10 and 11 are details of one of the string-guiding devices; Fig. 12 is a diagrammatical view illustrating the knotting operation; Fig. 13 is a view similar to Fig. 12, showing the knotter devices enlarged; Fig. 14 is an enlarged detail view showing the cams and operating mechanism for the knotter, string holder, string cutter, and other operative parts; Figs. 15, 16 and 17 are detail views showing the operation of the stripper which strips the string from the knotter to complete the knot; Fig. 18 is a further detail showing a bottom plan view of the knotter and coacting devices, such as the stripper, string guides, etc.; Fig. 19 is a side view of the parts shown in Fig. 18; Fig. 20 is a detail view of the string holder and cutting-off knife; Fig. 21 is a sectional view of the string holder shown in Fig. 20; and Figs. 22 to 25, inclusive, are detail views of the jaw portion of the knotter.

As illustrated in these drawings, 30 indicates a substantial frame having bearings for a main driving shaft 31, which shaft may be turned by means of a crank 32 or by means of any suitable form of power, such for instance as an electric motor, which, however, is not shown. A segmental gear 33 is mounted on the shaft 31, the toothed portion of this gear being adapted to mesh with the teeth of a pinion 34 mounted on a sleeve 35, which sleeve is rotatably supported on a stub shaft 36 extending inwardly from one end of the frame. The gear 33 contains approximately or exactly twice the number of teeth as the pinion 34, so that with each revolution of the main shaft the pinion and sleeve will make two complete revolutions. In order to prevent lost motion of the pinion and sleeve and to hold the same in fixed position during the time the blank portion of the gear 33 is passing the pinion 34 and also to insure the proper meshing of the teeth, the pinion is provided with two rollers 37, 37, which engage with a curved plate or segment 38 on the side of the gear 33, and on account of such engagement, hold the pinion in fixed position with respect to the gear. Securely mounted on the sleeve 35 is a cord or twine holder 39 of any ordinary or preferred form of construction and also a guide arm 40 for guiding the string or cord 41. The stub shaft or pin 36 carries at its inner end a plate 42, which, together with a plate 43 extending inwardly from the opposite end of the frame, forms a table, as it were, for the top of the machine where the articles to be tied are placed. A space is left between these plates 42 and 43 for the passage of the string or cord during the tying operation.

The parcel, bundle of letters or other article to be tied is placed upon the combined guide and holder 44. This holder preferably comprises a bottom plate 45, having upwardly extending sides or abutments 46 and 47 extending along two sides thereof and forming, as it were, an open-sided box. The plate 45 is mounted on a vertical shaft or pivot 48, working in a suitable bearing on the plate 43. At the lower end of the shaft 48 is a crank arm 49 which is connected by means of a link 50, with the upper end of a bent lever 51, which lever is pivotally mounted at 52 on projections 53 extending downwardly from the plate 43. At the lower end of the arm 51 is a roller 54 which engages with a cam slot 55 formed in the face of a cam wheel 56 which is rigidly mounted on the main shaft 31. This slot is so formed and the connecting parts so arranged that the holder 44 will, at a predetermined time, be turned substantially ninety degrees in order that the string may be wound around the package or parcel in two directions, and it is also preferably formed so as to give a slight movement to the holder just at the completion of the tying operation in order to assist in properly forming and releasing the knot.

The parcel to be tied is clamped or compressed by what may be termed relatively continuous and intermittent clamping devices. One of these devices, which is best shown in Figs. 8 and 9, consists of a plunger 57 which is adapted to reciprocate in a bearing 58 connected to the top of the plate or abutment 46, this plunger being arranged at one side of the pivotal support of the holder 44. The plunger is held in normally raised position by means of a spring 59 but may be held in depressed engaging position by means of a pawl 60 which coacts with a toothed rack 61 on the side of the plunger. This plunger is pressed downwardly to engage with the parcel by means of a tappet 62 which engages with the head or enlarged lower end of the plunger, as clearly shown in Fig. 1. The tappet 62 projects from a yoke 63, which yoke with its operative parts comprises the intermittent parcel clamping mechanism. The sides of the yoke extend downwardly through bearings 64 in the plate 43, and their lower ends are connected by means of a bar or rod 65 shown in Fig. 5. A rod 66 is pivotally connected at 67 to the center of the bar 65 and has its opposite end slidably engaging or telescoping with an arm 68, which arm is pivotally connected at 69 to a second arm 70, the latter being pivoted at 71 to a vertical post 72 extending upwardly from the bottom of the frame 30. The arm 68 extends some distance beyond the pivot 69, and its end is adapted to engage with a portion of the arm 70, thereby forming a jack-knife joint which may be bent in one direction but not in the other. At the opposite end of the arm 70 is a roller 73 which engages with a cam slot 74 formed in the face of a cam 75 which for convenience is arranged on the side of the gear wheel 33. The form of the cam is clearly shown in Fig. 7. A bar 76 is pivoted at 77 to the arm 70, and its opposite end is provided with a hole fitting over a rod 78 pivotally connected at 79 to the arm 68. A spring 80 on the outer end of the rod 78 tends to hold the bar 76 close against the lower side of the arm 70. In other words, this bar and spring arrangement tends to hold the arms 68 and 70 in alinement; however, when there is a sufficient resistance to the downward movement of the yoke 63, this double arm will yield or bend as clearly indicated in Fig. 6, the inner end of the arm 68 pressing down against the bar 76, which action is resisted by the spring 80. The cam groove 74 is so formed that during one revolution of the main shaft and at the proper times it will cause the yoke 63 to be drawn downwardly, the resistance of the parcel thereunder being opposed by the tension of the spring 80. During the first downward movement of the yoke, the tappet 62 engages with the plunger 57 and presses it tightly down against the parcel, where it is held by the pawl 60; then the yoke again moves upwardly to permit the holder 44 to be turned, which holder is turned by means of the cam and levers above described, and again moves downwardly to engage with the parcel while the string or cord is being passed around the parcel the second time, but at this time the plunger 57 is swung around so that it is not engaged by the tappet. After the knot has been tied, the yoke 63 again moves upwardly to release the package, and in order to also release the plunger 57 which is still holding the package, the yoke is provided with a second tappet 81 which strikes against a finger 82 secured to a vertically movable rod 83 mounted on the plate 46, as shown particularly in Fig. 8. This rod is normally held in depressed position by means of a spring 84, and has its upper end in alinement with the outer end of the pawl 60 so that when the rod is raised the upper end strikes the pawl, thereby releasing the same and allowing the plunger 57 to be raised by the action of the spring 59. At the time the plunger 57 is released, the holder 44 is just completing its return movement to normal position, and this swinging movement tends to throw the bundle toward the side of the machine and the completed bundle or parcel passes down over the downwardly bent end of the plate 42 and a second guide plate 85, as shown in Figs. 1 and 2.

Besides the means for holding and turning the package, the machine is provided with novel mechanism for holding, guiding, knotting and supporting the string or cord, which devices or apparatus will now be described.

In starting the knotting operation, the free end of the string or cord 41 is caught in the cord holder 86, which holder is operatively associated with a guide or push-off member 87. The holder 86 is mounted on the end of a pin 88, which pin extends through a hole 89 in a casing or block 90 secured to the lower face of the plate 43, as best shown in Figs. 20 and 21. The outwardly extending end of the rod 88, which is shown bent in this instance for the purpose of clearing other parts of the machine, is provided with a spring 91, tending to hold the rod in retracted position, that is, so that the holder or head 86 presses tightly against the outer face or wall of the block or casing 90, the string being held between this head or holder and the face of the wall. Immediately below the hole 89 is a second hole 92 passing through the casing 90, through which passes a bar or rod 93, the outer end of which carries the guide or push-off member 87. The bar or rod 93 is provided with a pawl 94, which pawl is adapted to engage with a bent arm 95 pivotally mounted at 96 in the casing 90 and adapted to engage with a roller 97 on the rod 88. It will be observed that the holder 86 is directly within the path of the portion of the string which extends from the end of the arm 40, around the parcel, when the arm 40 is swinging around the parcel. As the string is not to be held for tying until after it has passed around the parcel the second time, it will be noted that it must be guided or pushed away from the holder during the first revolution of the arm, and this is the purpose of the guide 87. It will also be noted that the cord holder should be released at about the time the knot is completed and just before the cord is severed, in order to free the short portion of the cord between the holder and the knot. This is accomplished by giving the bar 93 two distinct forward movements. During the first movement, as indicated in dotted lines, the guide 87 moves forward a short distance so as to throw the cord away from the holder; then, just at about the completion of the tying action, the bar 93 again moves forward a greater distance, which causes the pawl 94 to strike against the arm 95, throwing the arm away therefrom and causing this arm to press against the roller 97, thereby pushing the holder forward enough to free the cord. This double movement of the bar 93 is secured by having one end connected, by means of a pin or bolt 98, with a lug or projection 99 on a reciprocating bar or member 100, which member is slidably mounted in another reciprocating member 101 and which member also carries the severing device and a stripper for stripping the knot off from the knotter. This reciprocating bar or slide 100 is provided with laterally extending lugs or projections 102, which engage with the upper end of a lever 103 which is preferably pivoted on the same shaft 52 which carries the lever 51. The lower end of the lever 103 is provided with a roller 104, which engages with a slot 105 preferably formed in the cam wheel 56, this slot being given the proper configuration in order to produce the desired movements of the slide or bar 100. The slide 100, which is mounted in the second slide 101 which supports the knotter mechanism, is provided on one side of the knotter with a cutting-off knife 106 and a string pusher 107. Pivoted to the slide 100 on the opposite side of the knotter is a stripper 108, which is adapted to help complete the knot and to strip the completed knot from the jaws of the knotter by pushing the loop of twine which is wound about the knotter back toward the package while the cut off ends are firmly held by the teeth on the lower jaw well back between the closed jaws, thus tightening the string and insuring a firmly bound package. The forward end of this stripper is normally held away from the knotter jaws by means of a spring 109, and in order to cause the forward end to come in close to the knotter jaws at the proper time, the other end of the lever is adapted to engage a cam or shoulder 110 on the slide 101 as the latter moves forwardly.

In tying parcels which have comparatively little resiliency, such for instance as a package of letters, it is desirable, not only that the string be wound sufficiently tight around the package, but that the knot be made as close as possible thereto, so that after the knot has been formed the tension of the string around the package will not be substantially lessened on account of the length of the string between the knotter and the adjacent portion of the package. In order to accomplish this result, we have provided a novel form of knotter and means for operating the same, as well as novel devices for guiding or drawing the two plies of the string into proper position to be engaged by the knotter. The knotter 111 is mounted in the end of the slide 101, as clearly indicated in Figs. 18 and 19. The main jaw 112 of the knotter is mounted at the upper end of a short shaft 113 which has its bearing in the front end of the slide 101. The lower end of the shaft 113 is provided with a bevel gear 114 which meshes with a corresponding gear 115 on the end of a short horizontal shaft 116 which also has its bearing in the slide 101 and carries at the opposite end a pinion 117. This pinion is turned at the proper time for revolving the knotter by means of a segmental gear 118 extending from a disk or plate 119 mounted on the main shaft 31. The teeth of this segmental gear are preferably made of short pins, as indicated in Figs. 2 and 14. The lower or movable jaw 120 of the knotter is pivoted at 121 to the main jaw and carries at its lower end a roller 122, which roller is adapted to engage with the cam surface 123 at the end of the bearing for the shaft 113, whereby the lower end of the jaw will be swung outwardly at the proper time in order to cause the jaws to open to receive the string or cord. The portions of these jaws which engage with the string are comparatively long and narrow, as clearly indicated in Figs. 15 to 19, inclusive, and also Figs. 22 to 25, inclusive. The lower jaw 120 is also preferably provided with a number of teeth 124, as indicated particularly in Fig. 24. The upper jaw 112 is preferably flattened as indicated at 125, Fig. 23, in order to form a guide or surface for the end of the stripper 108 to slide along when this stripper is assisting in completing the formation of the knot. After the jaws have been opened to receive the string, they are again closed by means of an arm 126 which is pivoted at 127 to the slide 101 and is held in normal position by means of a spring 128, the arrangement being such that when the roller 122 engages with the end of this arm, it will be pressed inwardly, thereby causing the jaws to close. As it is necessary for these jaws to hold the string with considerable force at the completion of the knotting operation, we have arranged the end of the arm 126 so that it will strike a cam surface 129 on a portion of the slide 100 when the knotter recedes to complete the knotting operation. This cam surface presses against the arm 126 and thereby helps to hold it in close engagement with the roller 122 but releases the arm before the end of the stroke to allow the ends of the string to be drawn out of the knotter. The slide 101 is reciprocated horizontally by means of a lever 130, the upper end of which engages with lugs 131 on the side of the slide. This lever is pivoted at 52 on the same shaft as the levers 103 and 51 and is provided at its lower end with a roller 132 fitting in a cam slot 133 in the cam wheel 56, this slot being so shaped as to give the proper timing and movement to the knotter. In order that the knotter may properly engage with the string at a point close to the package, we prefer to mount the slide 101 in such manner that its outer end, that is the end carrying the knotter, may be raised when the knotter is moved forwardly. In order to do this, this slide is mounted in slots 134 and 135 in projections depending from the plate 43. The slot 135 is longer than the height of the slide, and in order to hold the slide normally in depressed position, we provide a plunger 136 which is pressed downwardly against the slide by means of a spring 137. The back or rear slot 134 is just sufficiently wide to allow the front end of the slide 101 to move up and down without binding at this point. In order to raise the front end of the slide at the proper time, it is provided with a roller 138 which is adapted to be engaged by means of a cam 139 which is mounted with the segmental gear 118 on the disk 119.

The guide which raises the lower ply of the string up into position to be engaged by the knotter, comprises a bent arm or finger 140 which has a groove 141 in its outer end for receiving the string and at the opposite end is made substantially in the form of a bellcrank. This lever is pivoted at 142 to lugs or projections 143 extending downwardly from the plate 43, and is operated by means of a pitman rod or link 144 which is pivoted at 145 to the elbow or bend in the finger 140 and is pivoted at 146 to the slide 101. When in normal position, this finger or guide hangs down substantially as indicated in Fig. 14, but when the slide 101 moves forwardly the link 144 swings the outer end of the finger up to engage with the string and raise it into proper position, substantially as indicated by the dotted lines in Fig. 19. The next string guide or controlling device is the one which presses down and in on the upper ply of the string, that is the one reaching from the holder to the top of the parcel just before the knotter is actuated. This device is best seen in Figs. 10 and 11, and comprises a finger or lever 147 having a notch 148 in the end thereof to engage with the string, and being pivoted at 149 to the end of a slide 150, which slide is mounted on the lower side of the plate 43 at substantially right angles to the slides 100 and 101. This slide is provided with two slots 151 and 152, the former of which is preferably curved at one end in order to give a desired outward movement to the finger 147, while the latter is preferably straight. This guide is held in position by means of pins 153 and 154 passing through said slides and having plates 155 and 156 at the lower ends thereof which bear against the lower surface of the slide 150. One end of the finger or lever 147 is provided with a roller 157 which is adapted to strike against a cam-like projection 158 on the plate 155 when the slide reaches the end of its throw, in order to force the outer or string engaging end of the finger downwardly. The slide 150 is held in normal position, which is indicated by dotted lines in Figs. 10 and 11, by means of a spring 159 which connects between a downwardly projecting lug on the slide and a pin on the plate 156. This slide is also provided with a downwardly projecting arm 160 having a roller 161 at the lower end thereof, which roller is adapted to be engaged by means of a cam 162 which is secured to, or projects from the disk 119 on the main shaft 31, the arrangement being such that when this disk is turned in the direction indicated by the arrow in Fig. 2, the cam will strike against the roller 161 as indicated in Fig. 10 and move the roller to the right, as indicated in this figure. This will cause the slide 150 also to move to the right, the first movement of the slide causing the finger 147 to move out into the pathway of the string on account of the curve in the slot 151, and the continued movement causing this finger to move to the right and draw the string down to a certain extent, while the final movement causes the roller 157 to strike the cam 158, thereby causing the outer end of the finger to move down still farther in order to bring the string into exact position to be engaged by the knotter.

The operation of the machine as a whole is as follows: The operator places the parcel to be tied, for instance a package of letters 163, as indicated in Fig. 12, in the holder 44, the parcel at such time preferably extending about halfway out of the holder and across the space between the plates 42 and 43, as indicated in Fig. 1. The machine, then being started with the main shaft turning in the direction indicated by the arrow in Fig. 2, first causes the yoke 63 to be drawn down against the package or parcel, which yoke simultaneously pulls down the plunger or holder 57. In the meantime, the free end of the string, having been caught in the holder 86, and the arm 40 revolving in an anti-clockwise movement around the package, causes the portion of the string between the end of the arm and the holder to be wound around the package, tension being placed on the string in the holder 39 if desired, such tension device, however, not being shown. When the end of the arm 40 approaches the string holder 86 during its first revolution, the guide or push-off device 87 will move forwardly so as to direct the string out of the path of the holder so that the string will be free to be wound around the package a second time. At about the time the arm passes the cord holder this time and as the string is completing its first winding about the package, the yoke 63 starts to move upwardly, thereby releasing the package, although it is still held to a certain extent by the plunger 57 which remains tightly pressed thereagainst. The next operation of the machine is to turn the holder 44 substantially ninety degrees through the instrumentalities above described, which causes the package to swing around, thereby crossing the string underneath the same, then the yoke 63 again moves downwardly and presses tightly against the package or parcel until the knotter has operated. Simultaneously, the arm 40 has continued its movement around the package so as to complete the winding of the string around the same in the second direction, which is at right angles to the first winding. This time, when the arm approaches the string holder 86, the guide 87 remains in retracted position so as to allow the string to engage with the holder as indicated by the dotted lines in Fig. 13. Then, as the arm 40 continues to swing around to its first or normal position, the knotting and severing operation takes place. The first element to step forward is the guide finger 147 which moves out into the path of the upper ply of the string, that is the portion extending between the top of the package and the string holder, then moves horizontally back so as to bend this portion of the string into a loop, as it were, adjacent to the lower corner of the package, as indicated in Fig. 13, thus tightening the string around the package; and at the final downward movement of the outer end of this finger, caused by its roller striking on the cam 158, the upper ply of the string is pressed down against the lower ply and the latter is also slightly depressed. Just as this occurs, the knotter moves forward so that both jaws pass above the strings. Then the finger 147 is released and jumps back to its normal position, and the finger 140 moves upwardly and engages with the lower ply of the string at the side of the knotter next to the package and slightly raises this portion of the string so that when the knotter turns, the beak or double jaws will pass under the end of the finger and also under or behind both plies of the string which then extend between the knotter and the package. At this time the beveled or cam surface 125 of the upper jaw presses against the lower side of the finger so as to raise the finger and yet remain as close thereto as possible. As the knotter continues to rotate, the jaws open and engage with the two plies of string then extending between the knotter and the string holder, the string at such time being substantially in the position around the knotter shown in Fig. 15. At about this time the string holder moves forward a slight amount in order to release the end of the string, this end being pushed out of the holder by means of the pusher 107, which moves slightly in advance of the knife 106. As soon as the end of the string is released, the holder again recedes in order to hold the portion of the string then extending from the holder to the arm 40. As soon as the holder engages this portion of the string, the knife 106 moves forwardly and severs the remaining ply of string then extending between the holder and the knotter. At about this time the knotter starts to recede and the stripper 108 moves forwardly as clearly indicated in Figs. 15, 16 and 17, the stripper serving to push the loop off from around the jaws of the knotter while the jaws still hold the ends of the string, thereby drawing portions of these ends through the loop around the jaws, these portions forming, as it were, double loops at one side of the loop around the jaws, and the latter being drawn very tightly, causes a secure knot to be made. As the knot is finally completed, the holder 44 swings around to its normal position, and the plunger 57, being released, permits the tied parcel to be thrown toward the side of the machine and over the guide plates 42 and 85, and the machine is then ready to receive the next parcel or package.

We have found by actual operation that a machine made in accordance with our invention as above described and as shown in the drawings will operate effectively and efficiently to tie packages, for instance, of letters or other articles and will perform such tying operation with great rapidity. However, it is obvious that various changes may be made in the construction of a machine embodying our invention, without departing from the spirit thereof, and therefore we do not wish to be limited to the exact construction or arrangement of parts herein shown and described, except as specified in the appended claims, and

What we claim and desire to secure by Letters Patent is:

1. In a parcel tier, the combination of means for wrapping a cord around a parcel, a cord holder, a knotter for tying the portions of the cord between the parcel and the holder, and means for drawing the two portions of the cord together adjacent to the package so that the knot may be tied close to the package.

2. In a package or parcel tier, the combination of means for holding a parcel, means for winding a string around the parcel, a holder for holding the ends of the string which has been wound around the parcel, a knotter for tying such ends together, guides for bringing the portions of the string to be tied, in close proximity adjacent to the parcel, and means for causing the knotter to engage with the string, close to the parcel in order to form the knot close to the same.

3. A cord holder for a tying device comprising a casing or supporting member, a rod slidably mounted in said member, a head on said rod, having its inner surface beveled to guide the cord, and a spring for pressing said head toward the supporting member, the arrangement being such that the string is held between the inner portion of the head and the supporting member.

4. In a package tier, the combination of means for supporting a package, a cord holder for holding the end of the string which is about to be wound around the package, means for winding said string around the package, said cord holder lying within the path of the string as it is wound around the package, and means for deflecting said string at a predetermined time or times away from said holder so that the string may be again wound around the package before engaging with the holder.

5. A combined cord holder and cord guide or deflecting device for a tying machine, comprising a casing or support, a rod slidably mounted in said support, a head on said rod, the cord being adapted to be held between said head and the end of said support, a spring tending to hold said head against the support, a roller on said rod, a bar slidably mounted in said support, a finger on the end of said bar and adapted to guide or deflect the cord away from the head at predetermined times, a pawl on said bar, an elbow lever pivotally mounted in said support and adapted to coact with said pawl and said roller, and means for reciprocating said bar, the arrangement being such that the bar may be moved outwardly to bring the finger into position for deflecting the cord away from the holder, then, when the bar is moved farther, the pawl will engage the elbow lever, causing the lever to press against the roller and move the rod forwardly to release the cord, and upon further movement of the bar the pawl will release the elbow lever and the finger will pass beyond its deflecting position.

6. In a package tier, the combination of means for holding the package, a cord holder for holding the free end of the cord which is to be wound around the package, said holder also being adapted to receive the portion of the cord after it has been wound around the package, a knotter for tying the portions of the cord between the package and the holder, a severing device for cutting the portion of the string which has been last wound around the package, between the knotter and the holder after the knot has been tied, and means for loosening the tension on the holder and pressing the free end of the cord out of engagement therewith just before the severing device operates, whereby the string will only be severed at one point and there will be no short pieces of string cut off by the severing device.

7. In a tying apparatus, the combination with a cord holder for holding the end of the cord and also the portion of the cord between the package to be tied and the source of supply and knotter for tying together the plies of said cord between the holder and the package to be tied, of means for releasing the end of the cord from the holder when the knot is tied, and means for severing the second portion of the cord between the knotter and holder, the arrangement being such that the cord is only cut once at each tying operation.

8. In a tying apparatus, the combination of a knotter for tying a cord, and a stripper adapted to coact with said knotter to push the loop formed around the beaks of the knotter off therefrom and to tighten said loop around the portions of the cord still held by the knotter beaks.

9. In a tying apparatus, the combination of a cord holder holding the free end of the cord, means for holding the article to be tied, a cord extending from said holder to a cord supply, means for winding the cord from said supply around the article to be tied, said cord again engaging with the holder and held thereby, a vertically movable finger for raising the portion of the cord between the holder and the article to be tied, a horizontally and vertically movable finger for depressing the upper ply of the cord between the holder and the article to be tied, a knotter for tying the cord, means for bringing said knotter forward to a point adjacent to the article to be tied, means for actuating said knotter, a stripper coacting with said knotter for completing the knot, a pusher for pushing the end of the cord which was first engaged by the holder, out of the holder, and a severing device for severing the other portion of the cord then extending between the holder and the knotter.

10. In a machine of the character set forth, the combination of a cord holder, means for wrapping the cord around a package, a knotter for tying the two portions of the cord between the package and the cord holder, a finger, means for moving said finger horizontally to engage with the upper ply of the cord between the package and the holder, and means for depressing the end of said finger to bring the cord into position to be engaged by said knotter.

11. In a machine of the character set forth, the combination with a knotter, of means for moving the same horizontally to cause it to engage with the cord, a finger for raising the cord up to be engaged by the knotter, and means coacting with said knotter moving mechanism for actuating said finger.

12. A parcel holder for a machine of the character set forth, comprising a plate having walls or stops on two sides thereof, and means for rotatably supporting said plate.

13. A combined parcel holder and guide, for a machine of the character set forth, comprising a rotatable plate having walls at two sides thereof and a plunger for holding the parcel against the plate.

14. In a machine of the character set forth, the combination of a parcel holder, means for rotating said holder, a plunger in said holder, a spring tending to raise said plunger, a ratchet and pawl for holding said plunger in depressed position, and a vertically movable yoke having its upper end adapted to engage with the parcel to be tied, said yoke being provided with means for depressing the plunger to cause it to engage with the parcel and also with means for releasing the pawl to allow the plunger to return to normal position.

15. In a machine of the character set forth, the combination of a parcel holder, means for rotating said holder substantially ninety degrees, a plunger in said holder, a spring for raising said plunger, a ratchet and pawl for holding said plunger in depressed position, a rod for releasing said pawl, an arm projecting from said rod, a vertically movable yoke for compressing the parcel to be tied, a tappet on said yoke for depressing the plunger so that it will engage with the parcel, a second tappet on said yoke for engaging with the arm on the rod for releasing the pawl, and means for reciprocating said yoke.

16. In a machine of the character set forth, the combination of a frame, a support for receiving the parcel to be tied, a vertically movable yoke, a yielding arm pivotally mounted in said frame and having one end engaging with the yoke, a cam for operating the other end of said arm, and a shaft on which said cam is mounted.

17. In a machine of the character set forth, the combination of a frame, a shaft mounted in said frame, means for turning said shaft, a segmental gear on said shaft, a pinion with which said gear is adapted to engage, a cord supply and a guide arm adapted to be turned by said pinion, a parcel support mounted on said frame, a cam on said shaft, means connecting between said cam and said support for rotating said support, a plunger mounted in said support, a vertically movable presser device for compressing the parcels, a yielding arm pivotally mounted on said frame and connected with said presser device, a cam on said shaft for actuating said arm, a slide, cutting off and stripping devices carried by said slide, a lever pivotally mounted in said frame and connecting with said slide, a cam on said shaft for actuating said lever, a cord holder and cord guide adapted to be actuated by said slide, a second slide in which said first-named slide is mounted, said second slide being mounted in bearings from the frame, a knotter carried by said second-named slide, a cam on said main shaft for raising said second-named slide at a predetermined time, means connecting with said main shaft for turning said knotter, a lower string guide finger pivotally mounted to said frame, a link connecting between said finger and said second-named slide for operating the finger, an upper string guide slidably mounted above said knotter, and a cam on said main shaft for actuating said upper string guide, substantially as described.

18. In a machine of the character set forth, the combination of a parcel holder, means for turning said holder substantially ninety degrees after the string has been wound once around the parcel, a string holder for holding the free end of the string, means for passing said string around the parcel, means for pushing said string aside from said holder the first time it is wound around the parcel but allowing the string to engage with the holder the second time it is wound around the parcel, means for compressing the parcel when the string is first wound around the same, said presser means then releasing the parcel when the parcel holder is turning, auxiliary presser means for pressing the parcel after the first-named means has released the same, said presser device again engaging with the parcel after it has been turned and previous to the tying of the same, means for bringing the portions of the string to be tied, close together adjacent to the parcel, a knotter for tying the string, means for raising said knotter close to the parcel, and means for severing the string.

BENJAMIN H. BUNN.
ROMANZO N. BUNN.

Witnesses:
JOHN W. CASEY,
C. M. BUNN.